United States Patent [19]
Martin, Sr.

[11] Patent Number: 5,605,448
[45] Date of Patent: Feb. 25, 1997

[54] AC FUEL PUMP

[76] Inventor: Thomas B. Martin, Sr., 1620 SE. Cascade Ave., Vancouver, Wash. 98684

[21] Appl. No.: 509,366

[22] Filed: Jul. 31, 1995

[51] Int. Cl.$^6$ ..................................... F04B 17/00
[52] U.S. Cl. ..................... 417/360; 417/411; 417/410.3; 417/410.4; 417/423.14
[58] Field of Search .................................. 417/360, 370, 417/411, 410.3, 410.4, 423.14

[56] References Cited

U.S. PATENT DOCUMENTS

| | | |
|---|---|---|
| 581,265 | 4/1897 | Bump . |
| 607,684 | 7/1898 | Draper . |
| 787,988 | 4/1905 | Moore . |
| 1,019,995 | 3/1912 | Seaman . |
| 1,020,995 | 3/1912 | Leeds . |
| 1,078,301 | 11/1913 | Moore . |
| 1,749,121 | 2/1928 | Barlow . |
| 2,662,476 | 12/1953 | French ...................................... 103/41 |
| 3,014,623 | 12/1961 | Horn et al. ........................... 417/410.4 |
| 3,160,147 | 12/1964 | Hanson ................................. 123/14 |
| 3,170,157 | 2/1965 | Schreitmueller ....................... 343/17.1 |
| 3,171,389 | 3/1965 | Cramer et al. ........................... 230/206 |
| 3,181,589 | 5/1965 | Phelps ...................................... 158/32 |
| 3,237,852 | 3/1966 | Shaw ....................................... 230/206 |
| 3,891,355 | 6/1975 | Hecht et al. ............................. 417/371 |
| 4,496,293 | 1/1985 | Nakamura et al. ..................... 417/371 |
| 4,715,800 | 12/1987 | Nishzawa et al. ........................ 418/69 |
| 4,743,176 | 5/1988 | Fry .......................................... 417/368 |
| 5,226,803 | 7/1993 | Martin .................................... 417/371 |
| 5,338,163 | 8/1994 | Frank et al. ............................. 417/360 |
| 5,421,706 | 6/1995 | Martin, Sr. ............................ 417/410.3 |

Primary Examiner—Charles G. Freay
Attorney, Agent, or Firm—Marger, Johnson, McCollom & Stolowitz, P.C.

[57] ABSTRACT

An AC pump sutiable for use in a locomotive having a DC auxiliary electrical system. The pump includes an AC motor having a housing and a vertically mounted rotor. A pump-body is clamped into place by a cap, which in turn is mounted to the housing by bolts which are readily accessible from above. A DC-AC inverter is housed in the cap. By removing the cap, the pump body can be removed, and the pump components can be accessed without disconnecting the DC-AC inverter from the DC current source.

7 Claims, 5 Drawing Sheets

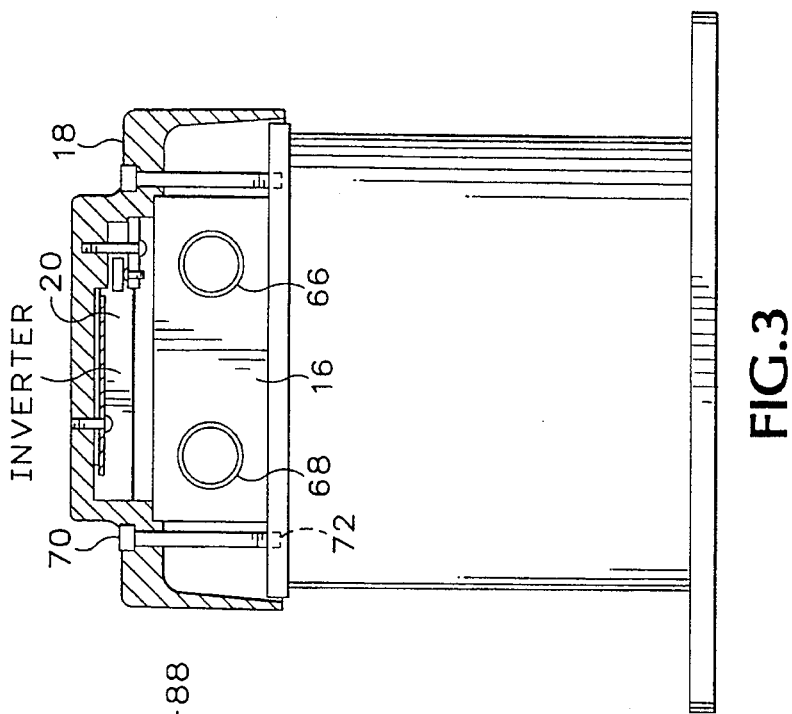
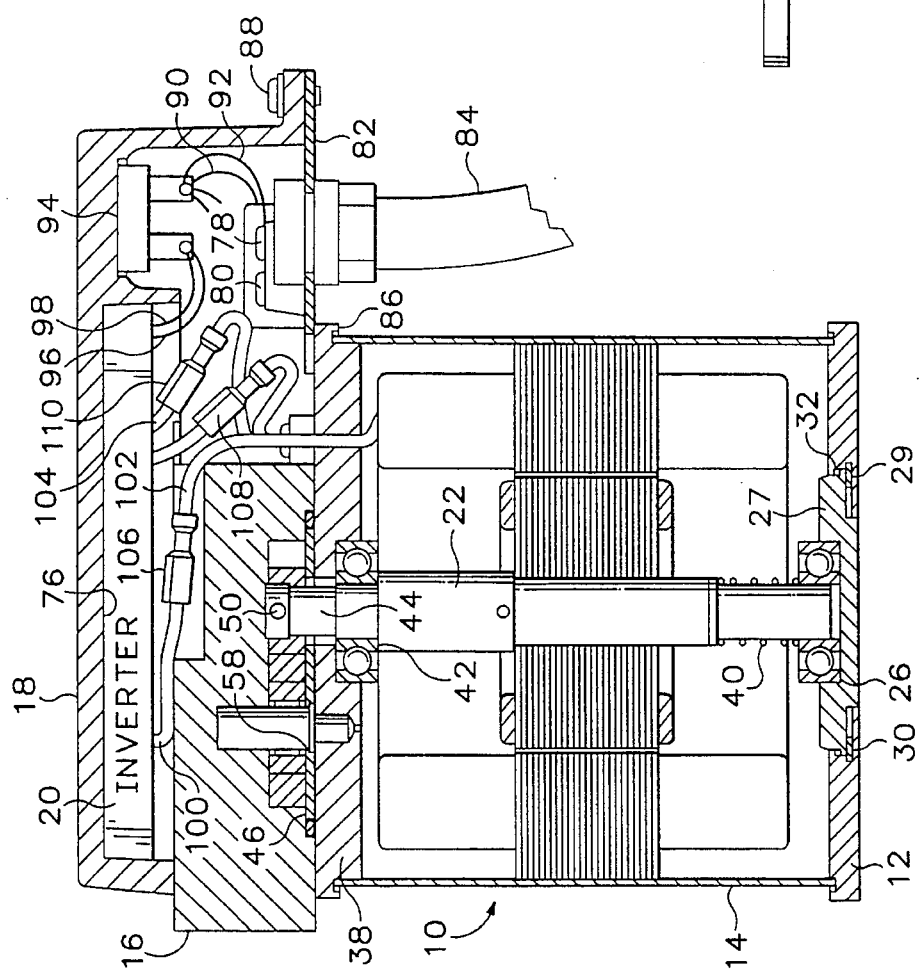

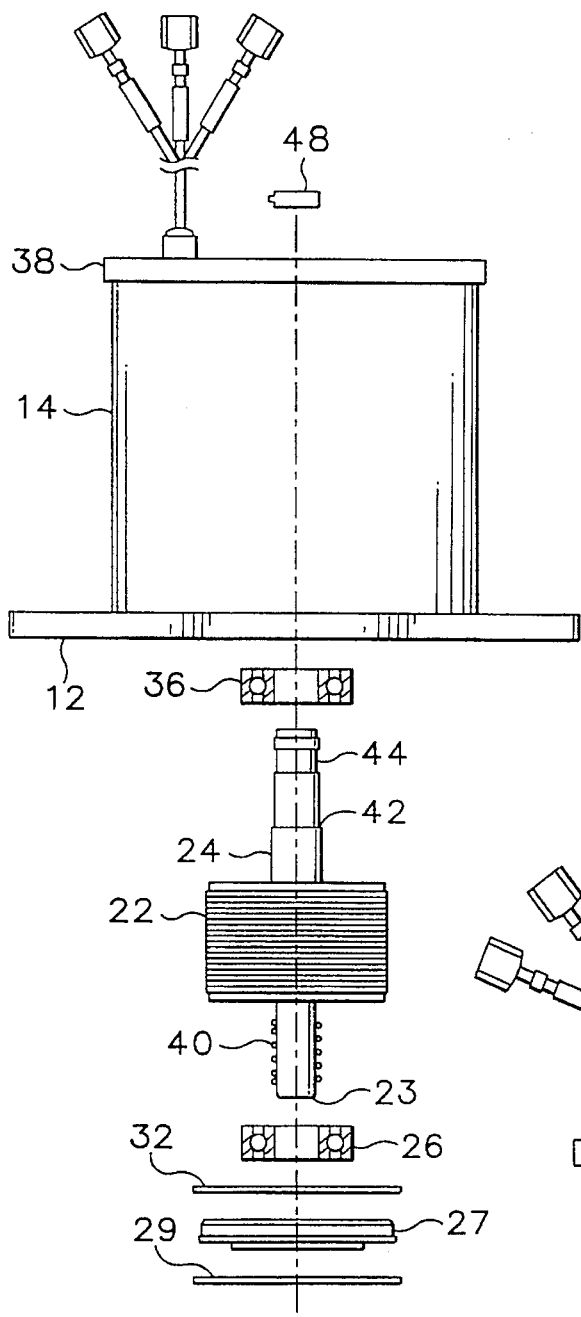
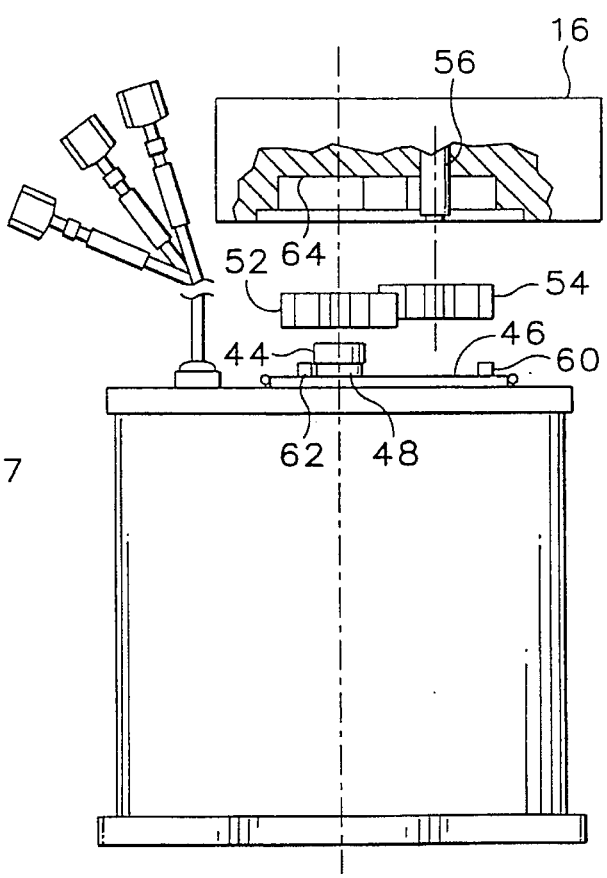
FIG.5
FIG.6

AC FUEL PUMP

BACKGROUND OF THE INVENTION

This invention relates to fuel pumps, and in particular to an improved AC fuel pump for use on a diesel-electric locomotive.

In known fuel pump designs, service and repair of the pump or motor normally requires disconnecting the unit from the electrical circuit. Doing so adds to the time required to service the pump, and in some circumstances, requires an electrician in addition to the pump mechanic. A need remains for a simple and durable pump which can be readily serviced without being disconnected from the electrical supply circuit.

SUMMARY OF THE INVENTION

The present invention represents an improvement over known pumps in that the pump and motor can be readily disassembled and serviced, including the replacement of all of the pump components, without disconnecting the DC-AC inverter from the DC current source. Service and repair is further facilitated by the novel arrangement of the invention wherein the pump body is clamped into place by the inverter cap, which in turn is mounted by bolts which are readily accessible from above.

The invention is embodied in a pump including an AC motor having a housing and a vertically mounted rotor. A cap is removably secured to the housing, and a pump body is clamped between the housing and the cap. The pump body and the housing cooperatively define a pump cavity. An upper portion of the rotor extends into the pump cavity, and pump means are mounted thereon. An inlet port and an outlet port communicate with the pump cavity. An DC-AC inverter is mounted within the cap, and has an output connected to the AC motor and an input connected to a DC current source. A rectifier may be installed between the inverter and the DC current source. The cap, the pump body and the pump means are all removable from the housing while the DC-AC inverter remains connected to the DC current source.

The pump means may include a first gear drivingly mounted on tile rotor upper end, and a second gear drivably engaged with the first gear. Alternatively, the pump means might include first and second vanes slidably mounted on the rotor upper end. Alternatively, the pump means may include a vane-type pump.

The pump further includes surfaces defining a liquid flow path from the pump cavity into the housing, and from the housing into the inlet port. The liquid flow path includes a first channel between the pump cavity and the housing and a second channel between the housing and the inlet port. Fuel drawn into the pump is circulated through the pump housing to lubricate and cool the motor.

The invention will now be described in greater detail by reference to the drawings.

BRIEF DESCRIPTION OF THE DRAWINGS

FIG. 3 is a front partial cutaway view along line A—A in FIG. 1.

FIG. 4 is a side cutaway view along line B—B in FIG. 1.

FIG. 5 is an exploded view of the AC motor assembly.

FIG. 6 is a partial exploded, partial cutaway view of the pump.

DETAILED DESCRIPTION

Figure 1:
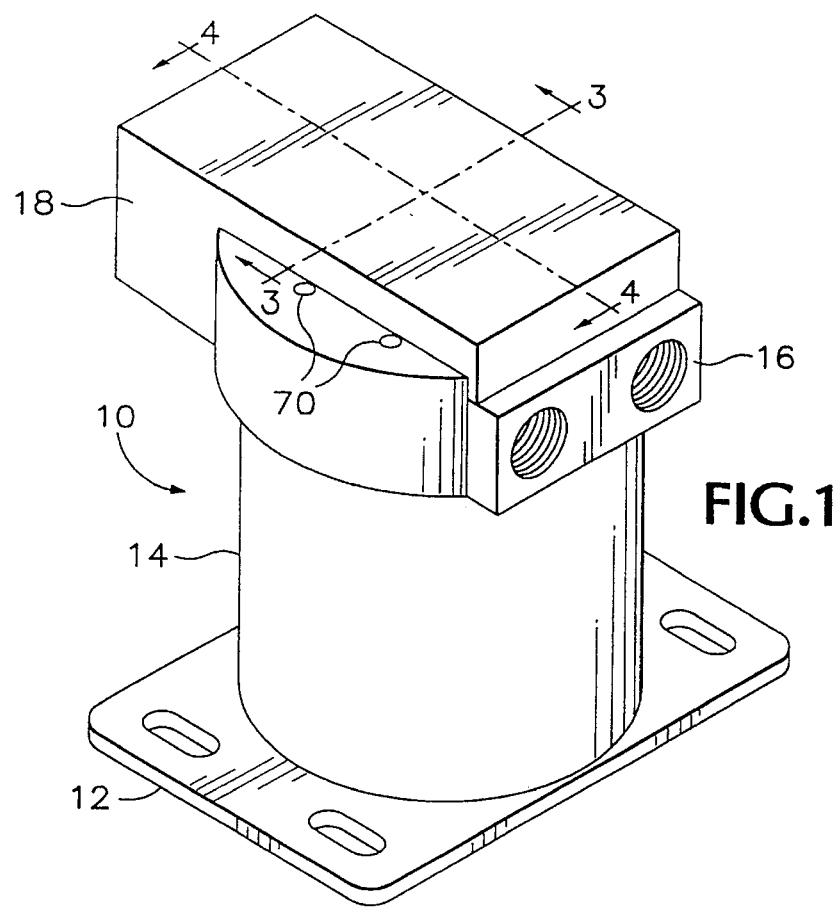
FIG. 1 is a perspective view of a pump according to the present invention.
Figure 2:
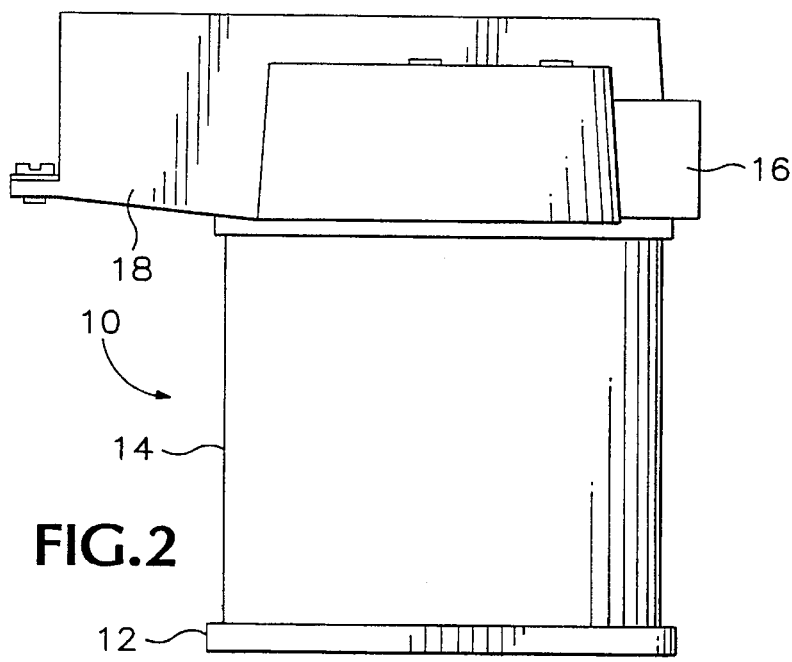
FIG. 2 is a side view of the pump shown in FIG. 1.

Referring now to FIGS. 1–3, a fuel pump according to the present invention, shown generally at 10, includes a base 12 a motor housing 14, a pump body 16, and a removable inverter cap 18 which houses a DC-AC inverter 20 (FIG. 4), and which isolates the fuel pump electrical connections from the surrounding environment. As best seen in FIGS. 4 and 5, a rotor 22 is mounted vertically in motor housing 14. The lower end 23 of shaft 24 rotates in bearing 26, which is mounted in a removable plug 27 fitted into base of housing 14. Plug 27 is retained in base 12 by a snap ring 29 fitted into groove 30. O-ring 32 seals the joint between plug 27 and lower end plate 28 against leakage. Shaft 24 rotates in bearing 36, which is mounted in upper end plate 38 of housing 14. Shaft 24 is located axially by spring 40 which urges shoulder 42 of shaft 24 upwardly against bearing 36.

Upper end 44 of shaft 24 extends through upper end plate 38 and through an optional gear spacer plate 46. A gear driving key 48 is fitted into a transverse hole 50 through the upper shaft end 44. Referring additionally to FIG. 6, a driver gear 52 is fitted onto shaft 24 and engaged with gear driving key 48. A driven gear 54 is mounted on shaft 56 and engaged with driver gear 52. Shaft 56 is fitted into pump body 16 and protrudes downwardly through driven gear 54 and a clearance hole 58 in gear spacer plate 46. Pump body 16 is mounted on motor housing 14, and located by dowels 60 and 62. Pump body 16 is clamped in place atop motor housing 14 by inverter cap 18, which is held in place by four socket head cap screws 70a–d which are threaded into corresponding holes 72a–d. Pump body 16 includes cavity 64 which together with counterrotating gears 52 and 54, comprise a gear pump which operates according to well-known principles to deliver pressurized fuel to the diesel engine of the locomotive. Briefly, fuel is drawn into cavity 64 through inlet 66, where it is pressurized and transported by counterrotating gears 52 and 54 around the periphery of cavity 64 to the outlet 68.

Figure 7:
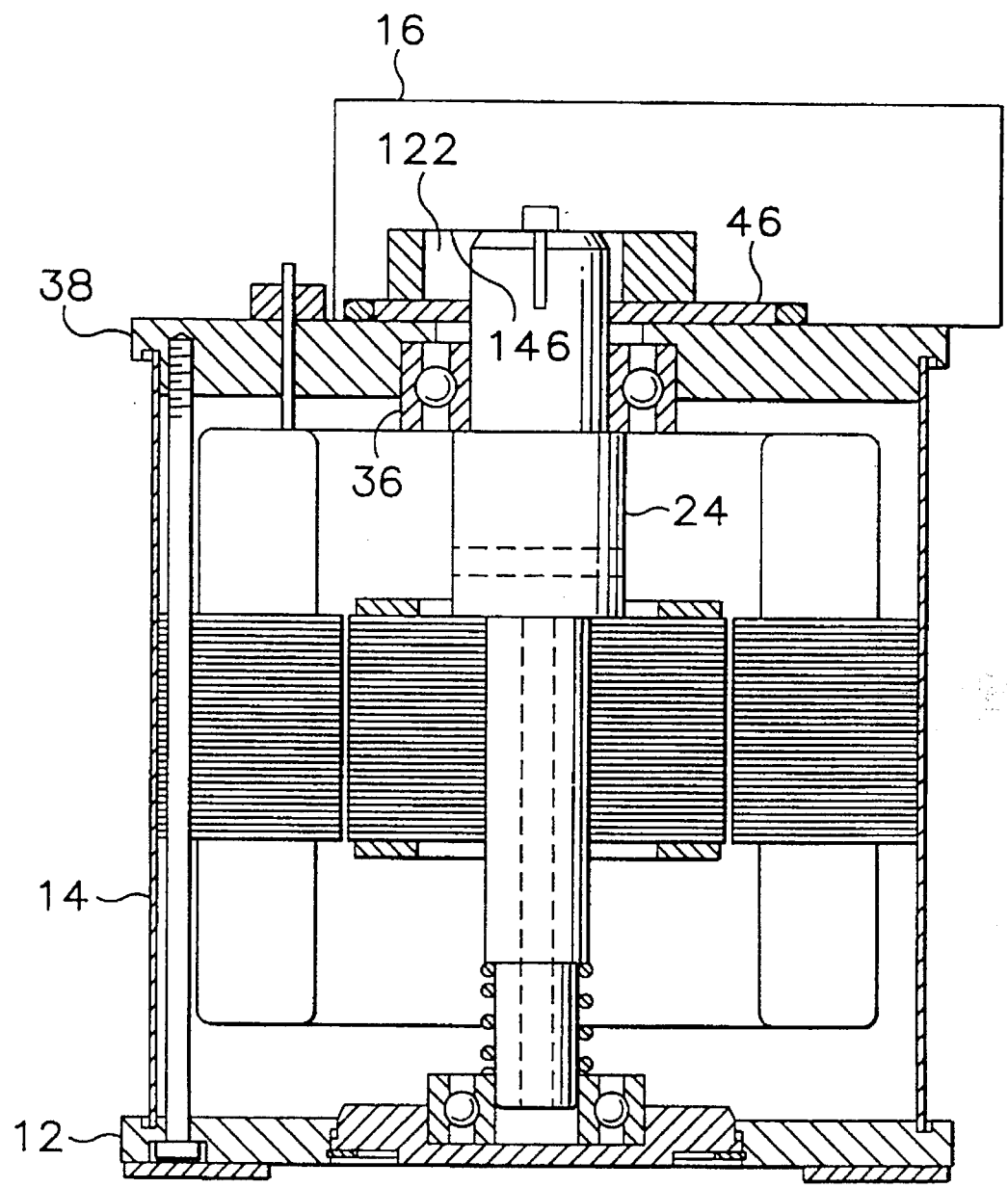
FIG. 7 is a side cutaway view along line B—B in FIG. 1 of an alternative embodiment.
Figure 8:
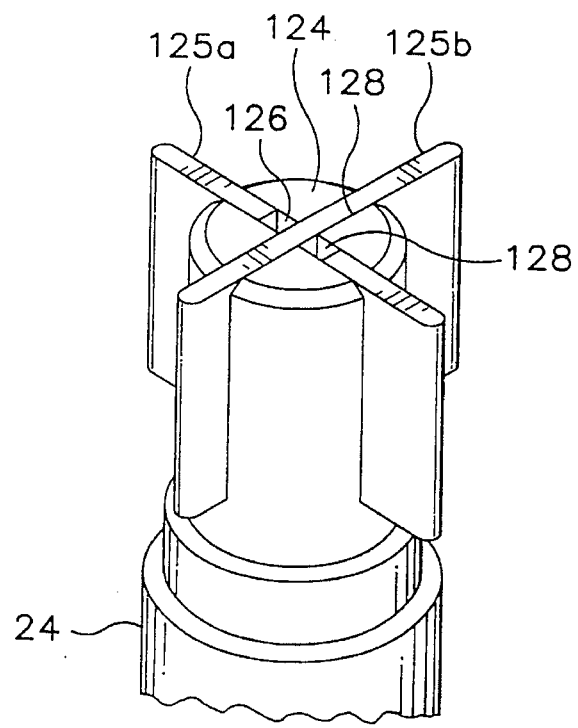
FIG. 8 is an enlarged partial view of the rotor upper end and sliding vanes of the embodiment shown in FIG. 7.
Figure 9:
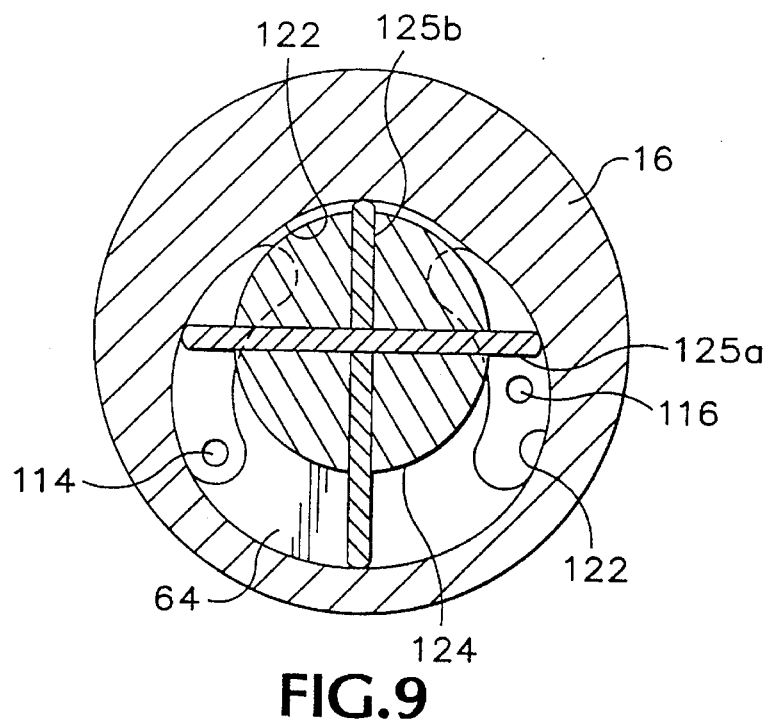
FIG. 9 is a cutaway top view of the pumping cavity, rotor and vanes of the embodiment shown in FIG. 7.

An alternative embodiment employs a vane pump in place of a gear pump. As best seen in FIGS. 7, 8 and 9, upper end of shaft 24 extends eccentrically into a pump cavity 122 and terminates at rotor face 124 at front wall 146. As best seen in FIG. 8, two perpendicular vane channels 126 and 128 are formed in rotor face 124. Sliding vanes 125a and 125b are fitted into each of the channels 126a and 126b. Each sliding vane 125 has a notch 128 which provides the clearance required for the vanes to be fitted into their respective channels, and to slide relative to each other as the pump rotates. Applicant has previously disclosed specific details of vane pump designs in U.S. Pat. Nos. 5,421,706 and 5,226,803, the disclosures of which are hereby incorporated by reference.

A DC-AC inverter 20 is fitted into recess 76 of inverter cap 18 and held in place there by an adhesive or a resin such as epoxy. DC current is supplied to the terminals 78 and 80 mounted on electrical connection plate 82 through wires in conduit 84. One edge of electrical connection plate 82 is inserted into slot 86, which is formed by the upper end plate 38 and a recess in cover 18. The opposite edge is removably attached to the inverter cap 18 by screw 88. Wires 90 and 92 connect terminals 78 and 80 to bridge rectifier 94, which ensures that DC current of the proper polarity is provided to inverter 20. Wires 96 and 98 connect bridge rectifier 94 to inverter 20. Wires 100, 102 and 104 connect the AC output of inverter 20 to the AC motor 22 through slip connectors 106, 108 and 110 respectively.

In one embodiment for use in a locomotive with a 20 VDC auxiliary electrical system, 20 VDC is supplied to terminals 78 and 80. Bridge rectifier is a model SCBA4, manufactured by Semtec. Inverter is a model 60339, manufactured by Enermorphics Corp., which inverts the 74 VDC input to a 56 VAC output. The 56 VAC output of inverter 18 is supplied to motor 22, which is a model P55BWR-856 manufactured by Emerson Electric Co. This embodiment of the invention has a fuel pumping capacity of 4–7 gallons per minute at 80 psi.

Motor 22 is lubricated and cooled by a flow of pressurized fuel from pump body 16 into motor housing 14 through holes 114. Fuel is discharged from motor housing 14 into inlet 66 through hole 116. The flow of fuel through motor housing is driven by the pressure differential between pump body 16 and inlet 66.

Applicant's novel design facilitates ready disassembly of the pump as follows. Screws 70*a–d* are first removed, connector mounting plate 82 is disengaged from slot 86, and cap 18 is lifted away. Note that in so doing, it is not necessary to disconnect any of the electrical connections to the DC-AC inverter or the AC motor. Pump body 16 is then lifted upwardly and disengaged from dowels 60 and 62, exposing gears 52 and 54. In cases where the pump is jammed by debris in the pump, the debris can now be cleared and the pump and cap reassembled, again without the need for disconnecting any electrical leads. inverter 20 can be replaced by disconnecting, motor 22 can be electrically disconnected at connectors 106, 108 and 110. The ready and simple disassembly of the pump represents a significant improvement in the art due to the resulting time savings.

Having described the invention in terms of the foregoing embodiments, it will be appreciated by those skilled in the art that changes can be made without departing from the scope of the following claims.

I claim:

1. A pump comprising:

an AC motor having a housing and a rotor mounted vertically in the housing;

a cap removably secured to the housing;

a pump body clamped between the housing and the cap, the pump body and the housing cooperatively defining a pump cavity;

the rotor having an upper end extending into the pump cavity;

pump means within the pump cavity and operatively connected to the rotor upper end;

an inlet port and an outlet port in communication with the pump cavity; and a DC-AC inverter mounted within the cap and having an output electrically connected to the AC motor and an input electrically connected to a DC current source.

2. A pump according to claim 1 further comprising the cap, the pump and rotor being removable from the housing with the DC-AC inverter connected to the DC current source.

3. A pump according to claim 1 wherein the pump means comprises a first gear drivingly mounted on the rotor upper end, and a second gear drivably engaged with the first gear.

4. A pump according to claim 1 wherein the pump means comprises first and second vanes slidably mounted on the rotor upper end.

5. A pump according to claim 1 which further comprises surfaces defining a liquid flow path from the pump cavity into the housing, and from the housing into the inlet port.

6. A pump according to claim 5 wherein the liquid flow path includes a first channel between the pump cavity and the housing and a second channel between the housing and the inlet port.

7. A pump according to claim 1 wherein the DC-AC inverter input electrically connected to a DC current source includes a rectifier.

\* \* \* \* \*

UNITED STATES PATENT AND TRADEMARK OFFICE
CERTIFICATE OF CORRECTION

PATENT NO. : 5,605,448
DATED : February 25, 1997
INVENTOR(S) : Martin, Sr.

It is certified that error appears in the above-indentified patent and that said Letters Patent is hereby corrected as shown below:

Column 1, line 44, change "tile" to --the--.

Signed and Sealed this

Twenty-first Day of October 1997

Attest:

BRUCE LEHMAN

Attesting Officer     Commissioner of Patents and Trademarks